United States Patent
Bostick et al.

(10) Patent No.: US 9,569,426 B1
(45) Date of Patent: *Feb. 14, 2017

(54) SELECTIVELY SENDING NOTIFICATIONS TO MOBILE DEVICES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,223

(22) Filed: Jul. 25, 2016

Related U.S. Application Data

(63) Continuation of application No. 14/873,234, filed on Oct. 2, 2015, now Pat. No. 9,462,570.

(51) Int. Cl.
*H04M 1/663* (2006.01)
*G06F 17/27* (2006.01)
(Continued)

(52) U.S. Cl.
CPC ....... *G06F 17/2785* (2013.01); *G06F 17/2705* (2013.01); *H04L 12/1859* (2013.01);
(Continued)

(58) Field of Classification Search
CPC .... H04W 68/005; H04W 68/02; H04W 68/12; H04L 67/10; H04L 67/1095; H04L 12/1859; H04L 29/08693; H04L 67/26
(Continued)

(56) References Cited

U.S. PATENT DOCUMENTS

| | | |
|---|---|---|
| 7,302,280 B2 | 11/2007 | Hinckley et al. |
| 8,876,850 B1 | 11/2014 | Vollmers et al. |

(Continued)

FOREIGN PATENT DOCUMENTS

EP 2818996 A1 12/2014

OTHER PUBLICATIONS

P. Mell et al., "The Nist Definition of Cloud Computing", National Institute of Standards and Technology, Information Technology Laboratory, Sep. 2011, pp. 1-7.

*Primary Examiner* — Dominic Rego
(74) *Attorney, Agent, or Firm* — John R. Pivnichny; Law Office of Jim Boice

(57) ABSTRACT

A computer-implemented method, system, and/or computer program product selectively sends push notifications to mobile devices. One or more processors determine that a push notification of a mobile device event is to be issued to one or more mobile devices from a set of mobile devices. The processor(s) receive a status of applications running on at least one mobile device from the set of mobile devices and an extent of user engagement for at least one of the applications. The processor(s) associate a content with the push notification, and parse and evaluate the content. The processor(s) select a mobile device from the set of mobile devices based on the status of the applications, the extent of user engagement, and the parsed evaluated content, and then transmit the push notification to that mobile device.

20 Claims, 5 Drawing Sheets

(51) Int. Cl.
  *H04W 4/08* (2009.01)
  *H04L 29/08* (2006.01)
  *H04L 12/18* (2006.01)
  *H04W 68/00* (2009.01)
  *H04W 68/12* (2009.01)
  *H04W 68/02* (2009.01)

(52) U.S. Cl.
  CPC ........ *H04L 29/08693* (2013.01); *H04L 67/10* (2013.01); *H04L 67/1095* (2013.01); *H04L 67/24* (2013.01); *H04L 67/26* (2013.01); *H04L 67/327* (2013.01); *H04W 4/08* (2013.01); *H04W 68/005* (2013.01); *H04W 68/02* (2013.01); *H04W 68/12* (2013.01)

(58) Field of Classification Search
  USPC ................. 455/412.2, 418, 186.1, 414.1
  See application file for complete search history.

(56) References Cited

U.S. PATENT DOCUMENTS

| | | | |
|---|---|---|---|
| 2002/0087266 A1* | 7/2002 | Sugimoto | G01C 21/20 701/468 |
| 2002/0112063 A1* | 8/2002 | Lohr | H04M 3/42 709/230 |
| 2007/0123222 A1* | 5/2007 | Cox | H04M 3/4938 455/414.1 |
| 2011/0238734 A1 | 9/2011 | Curry et al. | |
| 2012/0303666 A1* | 11/2012 | Freed | G06F 17/30873 707/781 |
| 2012/0311096 A1* | 12/2012 | Hurley | H04L 67/06 709/219 |
| 2012/0315876 A1 | 12/2012 | Srinivasan | |
| 2013/0089019 A1* | 4/2013 | Choi | H04N 21/4788 370/312 |
| 2013/0316744 A1 | 11/2013 | Newham et al. | |
| 2013/0336310 A1 | 12/2013 | Laasik et al. | |
| 2013/0336311 A1 | 12/2013 | Laasik et al. | |
| 2014/0036309 A1 | 2/2014 | Oguma | |
| 2014/0057606 A1 | 2/2014 | Kunjithapatham et al. | |
| 2014/0067511 A1* | 3/2014 | Froes | G06Q 30/0233 705/14.33 |
| 2014/0068045 A1 | 3/2014 | Tarui et al. | |
| 2014/0090005 A1* | 3/2014 | Fujisawa | H04H 20/93 725/131 |
| 2014/0108506 A1* | 4/2014 | Borzycki | H04L 67/10 709/203 |
| 2014/0123257 A1 | 5/2014 | Gordon et al. | |
| 2014/0172973 A1 | 6/2014 | Zadorozny et al. | |
| 2014/0189808 A1 | 7/2014 | Mahaffrey et al. | |
| 2014/0206328 A1 | 7/2014 | Varoglu et al. | |
| 2014/0240122 A1 | 8/2014 | Roberts et al. | |
| 2014/0273978 A1 | 9/2014 | Van Snellenberg | |
| 2014/0287786 A1 | 9/2014 | Bayraktar et al. | |
| 2015/0025874 A1 | 1/2015 | Matute | |
| 2015/0089587 A1 | 3/2015 | Hurtta | |
| 2015/0181556 A1 | 6/2015 | Dey et al. | |
| 2015/0243245 A1* | 8/2015 | Jung | H04W 52/027 345/520 |
| 2015/0282106 A1 | 10/2015 | Xue et al. | |
| 2015/0287093 A1* | 10/2015 | Steele | G06Q 30/0269 705/80 |
| 2015/0324751 A1* | 11/2015 | Orenstein | G06F 19/3481 702/3 |
| 2015/0371031 A1 | 12/2015 | Ueno et al. | |
| 2016/0140550 A1 | 5/2016 | Keys | |
| 2016/0269413 A1* | 9/2016 | Rybak | H04L 63/10 |

* cited by examiner

SELECTIVELY SENDING NOTIFICATIONS TO MOBILE DEVICES

BACKGROUND

The present disclosure relates to the field of mobile devices, and specifically to mobile devices that are capable of receiving notifications regarding operations of the mobile devices. More specifically, the present disclosure relates to selectively sending notifications to specific mobile devices based on operational states of the specific mobile devices.

SUMMARY

A computer-implemented method, system, and/or computer program product selectively sends push notifications to mobile devices. One or more processors determine that a push notification of a mobile device event is to be issued to one or more mobile devices from a set of mobile devices. The processor(s) receive a status of applications running on at least one mobile device from the set of mobile devices and an extent of user engagement for at least one of the applications. The processor(s) associate a content with the push notification, and parse and evaluate the content. The processor(s) select a mobile device from the set of mobile devices based on the status of the applications, the extent of user engagement, and the parsed evaluated content, and then transmit the push notification to that mobile device.

DETAILED DESCRIPTION

Figure 1:
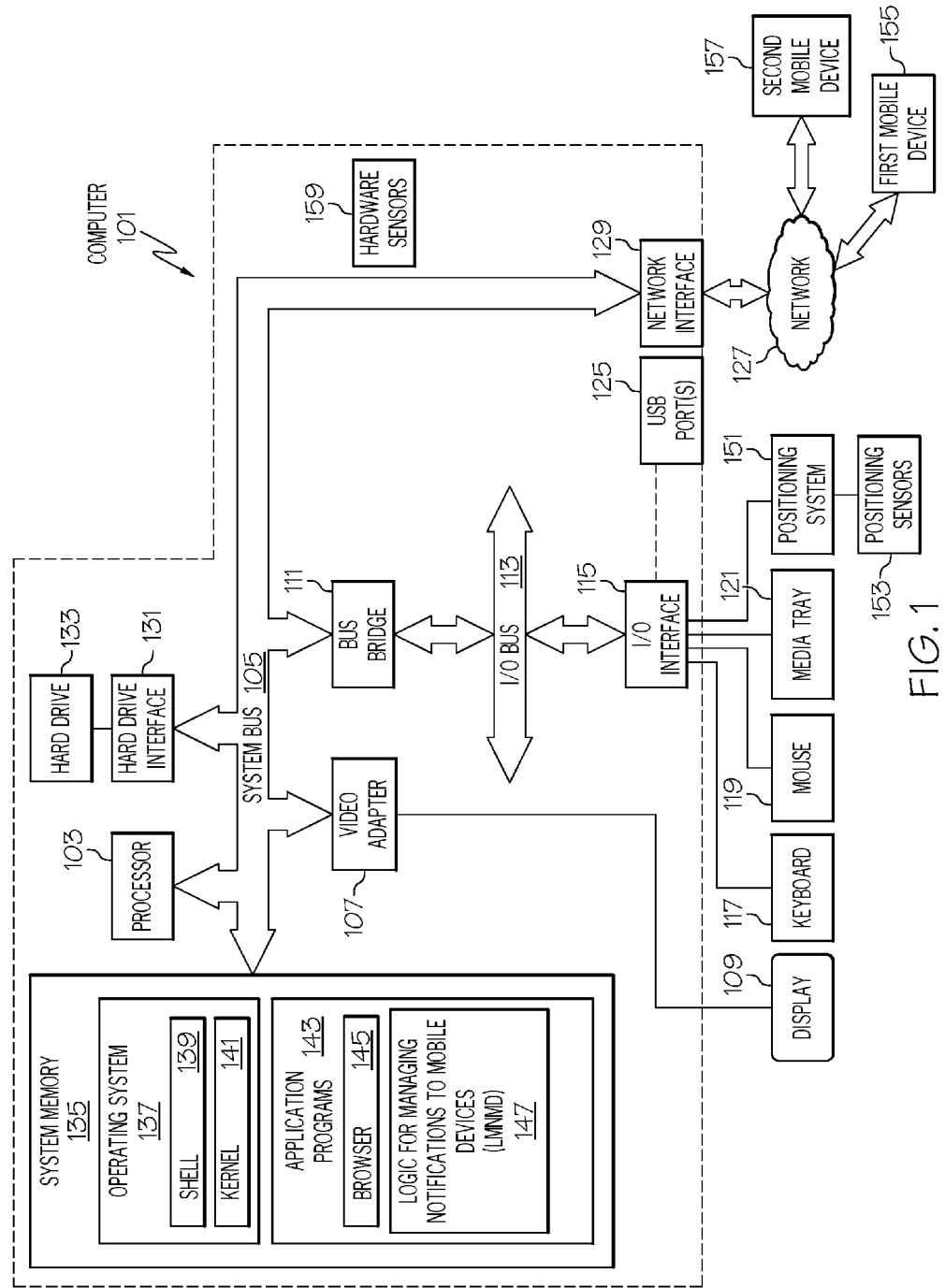
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a method and system by which analysis of criteria are used to determine which mobile device to send a given notification to, such as when a notification should be sent to a smart watch (i.e., a miniaturized computing device that is worn by a user and/or is synched to a mobile phone carried by the user) and when a notification should be sent to the mobile phone. Through analysis the system determines the best place (e.g., smart watch or mobile phone) to send a given notification based upon (1) how a user is currently using their mobile devices and based upon (2) the specific content contained within the notification.

While the present invention is described in one or more embodiments as being related to selectively sending notifications to a smart watch or a mobile phone, the invention described herein is also applicable to selectively sending notifications to a tablet computer, a desktop computer, a mobile phone, a smart watch, or some other type of electronic device capable of receiving a notification. For example, the present invention may send a notification to a desktop computer if the user's tablet computer is in use, or vice versa. In a preferred embodiment the notification is sent to a different type of device than that the type of device that the notification as originally intended. For example, if the notification was originally directed to a laptop computer, then in accordance with one or more embodiments of the present invention that notification will be sent instead to a desktop computer, a smart watch, a mobile phone, etc., such that each of these alternative recipients of the notification are of a different type of device than the original desktop computer.

A notification is defined as a notice message generated by and/or sent to a mobile device regarding a status of events related to the mobile device. The notification may be with regard to events related to software applications running on the mobile device and/or hardware states of hardware within the mobile device.

Examples of notifications related to software applications include, but are not limited to, notifications of an incoming text message to the mobile device, an incoming e-mail to the mobile device, a calendar alert from an electronic calendar (thus notifying the user that it is time for a scheduled event to occur), a timer alarm (thus notifying the user that a countdown timer has reached zero), an incoming phone call, an incoming software update that is being transmitted to the mobile device, a weather report from a weather service, and an error message related to the status of the applications running on the mobile device.

Examples of notifications related to hardware on the mobile device include, but are not limited to, notifications about processor usage and bandwidth, availability and/or changes to the amount of available wireless bandwidth to the mobile device, temperatures of specific components within the mobile device of an overall/average temperature within the mobile device, a temperature of an exterior surface of the mobile device, a connectivity status of a short range transceiver between the mobile device and another mobile device, and a status (e.g., charge level) of a battery in the mobile device.

As the number of mobile devices people own today increases (for example a single user may own a mobile phone, tablet, and smart watch) so does the complexity of picking the right device to send a given notification to. Consider how certain companies handle notifications for a user with a mobile phone and a smart watch. By default all notifications may be sent to the smart watch. However, if the mobile phone is paired with the smart watch while the mobile phone is currently unlocked (i.e., the user interface is enabled to both present content and receive inputs associated with one or more applications), it is assumed the user is using the mobile phone. Therefore, notifications are sent to the mobile phone instead of the smart watch. This pattern of sending notifications to the currently active device is common for notification systems where multiple devices are logged in to the same account. Other notification systems simply blanket send notifications so they are displayed on every mobile device.

The pattern of sending notifications to the device currently in use is designed to ensure that the notification reaches the user in the most optimal way. If a user is currently using their mobile phone, then all notifications are sent to that mobile phone until they lock the device (e.g., turn off the touch screen or else turn the entire mobile phone off). However this can often lead to missed notifications (not noticed while the user is talking on the phone) or inappropriate assignment of notifications (i.e., inappropriate for whomever is currently using the phone).

For example, a user may have his/her mobile phone turned on and unlocked but are not actively using it. For example, the mobile device may be unlocked to stream music to nearby speakers via a short range wireless network. Similarly, the mobile device may be currently used for spoken navigation directions from a mobile mapping and directions application. In these instances notifications are sent to the mobile phone instead of an alternative device such as the smart watch. But the mobile phone may not be in view of the user and they will miss any notifications displayed on the device.

Another user may be making use of the unlocked device. For example a child may use a parent's mobile phone to stream video content that is appropriate for the age of the child. The phone is unlocked and therefore notifications are sent to it. However the phone is not in possession of the parent, and it would be more appropriate to send notifications to an alternative mobile device such as the smart watch, since the child is uninterested in notifications that are intended for the parent (e.g., e-mail notifications).

Notifications sent to a smart watch are more intrusive than those sent to a mobile phone. While a user can specify which mobile apps can send notifications to a smart watch or to a phone, this is typically performed on a per-app basis rather than based upon the content of the notification. That is, the user may be interested in notifications that his/her posts on social media are being reposted by a famous celebrity with millions of followers of his/her postings, but less interested in receiving a notification that he/she is being followed by a spam account with only 10 followers.

Thus, the present invention presents a solution that uses context to send appropriate notifications to appropriate mobile devices that goes beyond just looking at which device is currently "active", pre-defined per-app rules, or blanketing all mobile devices with the same notifications. In one or more embodiments, the present invention uses analytics to determine on a case-by-case basis if a notification should be sent to, for example, a smart watch or a mobile phone.

Thus, the present invention presents a method and system by which criteria are used to determine which mobile device to send a given notification to. The selection criteria include, but are not limited to: (1) determining if a mobile device is actively being used and is visible to the user; (2) determining if a mobile device is being used by the intended user; and (3) determining if the content of the notification is suitable for a given mobile device The present invention enhanced existing mobile device notification selection processes by including an analysis of criteria that considers how a given mobile device is being used, by whom, and in what context. This analysis uses a series of analysis techniques including monitoring of running apps (software applications), monitoring of app (software application) usage, Natural Language Processing (NLP) of notifications, notification interaction analysis, and app importance analysis to make selection decisions on the best mobile device to route a notification to.

The present invention utilizes one or more of the following criteria to determine on which mobile device (such as a mobile phone or a smart watch) a given notification should be sent to.

Criterion 1: Is the mobile device being actively used and visible?

This criterion is used when a mobile device is considered "in use". However, it goes beyond checking to see if the device is unlocked to check for one or more of the following:

Monitoring of running app—The system determines which app is currently running on the mobile device. This is compared to a list of apps where notifications should not be received. These are apps that while running typically do not hold the users full attention (e.g., the user is not continually looking at the screen of the mobile device while the app is running), and therefore may not see a notification placed there. Examples are map and navigation apps that display navigation directions on a digital map on the mobile device and/or via audible directions, or a music app in which the mobile device is being used to stream music to nearby speakers via a short range network. This list of apps can be both user-defined (users set which apps that, when running, mean they don't want to receive notifications on that device) and automatically through analysis of notification responses (the system notes overtime which apps lead to missed notifications and therefore imply that the user did not see the notification because a specific app was being used).

Monitoring of app usage activity—The system determines if the user is actively using the unlocked mobile device by measuring user input activity. This measurement utilizes the context of the app to determine user activity. For example if an e-mail app is open the system monitors for selection and scrolling of messages, and keyboard input for the creation of new messages. If no user input is received within (for example) 2 minutes while the e-mail app is running, this may indicate the device is not actively been used. Conversely a period of inactivity of 2 minutes when the user is waiting for a video app to complete streaming/downloading video content would not be flagged accordingly. If the system determines that based upon the current app running that the mobile device is not being actively used, notifications will not be sent to this device.

Criterion 2: Is the mobile device being used by the intended user?

This criterion is used to judge if the intended recipient of a notification (the owner of the mobile device) is actually using the mobile device. This determination may be performed by one or more of the following:

Monitoring of running app—The system determines which app is currently running on the mobile device to determine the likelihood that the owner of the mobile device is actually using it. For example if mobile device is running an app called "Learn My ABCs" it can be assumed that the mobile device is being used by a child, and therefore notifications to the adult parent should not be sent to this device.

Monitoring of app usage activity—The system goes beyond looking at what app is running to see specifically how that app is being used. For example consider a video streaming app. If the app is running using the regular profile (e.g., for the parent) then it can assume that the owner (the parent) of the mobile device is likely using it. However if the video streaming app is running the child's profile it can be assumed the mobile device is instead being used by a child and therefore notifications for the parent should not be sent to this device.

Identification of mobile user—Some mobile devices are shared between multiple users. For example a parent's mobile device can also be unlocked by the child of that parent. The system can determine which user actually unlocked the mobile device through an authentication method used to unlock the device (user specific passcode, fingerprint scanner) or use an onboard camera to utilize facial recognition. If the intended recipient of a notification is not the person currently using the mobile device, notifications are not sent to it.

Criteria 3: Is the notification content appropriate for a given mobile device?

This criteria is used to judge which mobile device is suitable to send a notification to based upon the content of the notification. It goes beyond assigning notifications from specific apps to specific devices (for example all notifications from Twitter should be displayed on the smart watch) to make a determination on a case-by-case basis.

Mobile devices can be assigned levels of notification priority, for example:

Smart Watch=Notification priority "High". This "High" notification priority applies to notifications that contain time-sensitive, important, and/or relevant information to a particular app and/or notifications that require a reply.

Mobile Phone=Notification priority "Low". This "Low" notification priority applies to notifications that do not need to be seen immediately.

As each notification is received, the system uses one or more of the following techniques to determine which notification priority should be assigned and therefore which mobile device to send the notification to:

Natural Language Processing—Analyzes the content of the message contained within the notification in order to determine the notification's importance. For example, consider two Short Message Service (SMS) messages, where one of the SMS messages states "Are you there?" and the other SMS message states "New promotion discount from Company X for a discounted vacation". Through Natural Language Processing the first message is deemed high priority (it is personal, and is asking a question requiring a response) and is sent to the smart watch where it will be likely seen the quickest. The second message is considered lower priority and sent only to the mobile device, which is less intrusive. Alternatively the content of some messages may be considered sensitive and should not be shown on certain mobile devices. For example, a particular message may be a private message from a close person friend, and thus should only be shown on a watch and not a tablet (which may be more visible to other parties).

Notification interaction analysis—The system monitors which notifications elicit an interaction from a user, and on which device. This can determine the most effective mobile device to send the notification to. For example, the notification interaction analysis may determine that a user likes to receive SMS messages from Friend A on his smart watch, where he will interact with them (read the message and/or reply), but SMS messages from Friend B are typically not read immediately, and therefore should be sent to his mobile phone where they will be less intrusive. This is a learned pattern of usage, specific to an individual mobile device user.

App importance analysis—Two similar notifications from a given app may have varying levels of importance. For example, consider two notifications from a social media service informing the user they have a new follower of their posts.

Notification #1 reads: "@FamousPowerfulPerson is following you". This social media service user ("FamousPowerfulPerson") has a large influence (e.g., 22 million followers), and therefore this is a significant notification.

Notification #2 reads: "@MrNobody is following you". This social media service user has 7 followers and has been marked as a potential spam account. By analyzing the importance of a given notification to an app, the system can determine whether to assign a high or low notification priority to it and on which mobile device to send the notification.

Thus, in accordance with one or more embodiments of the present invention, a Mobile Notification Service receives mobile notifications and is responsible for routing them to the most appropriate mobile device(s). The system described in this invention is implemented in this Mobile Notification Service (e.g., part of the Logic for Managing Notifications to Mobile Devices (LMNMD) shown in FIG. 1, and/or notification selection and transmission processing 96 depicted in FIG. 5).

The Mobile Notification Service tracks all mobile devices (such as mobile phones, smart watches, and tablets) that are logged in and registered to a given user. The service also tracks current usage of each device noting locked status (locked or unlocked), current app running, and current user interaction.

As new notifications are received by the Mobile Notification Service, the system determines which mobile devices(s) to send the notifications to using the criteria described in the invention. This involves analyzing locked status, current app running, and current user interaction. In addition to analyzing the mobile devices, the system also analyzes the content of the notification itself utilizing Natural Language Processing, the importance of the notification to a given app using app importance analysis, and analyzes historical notification interaction data.

The output of the analysis is a recommendation of which mobile device(s) to send a given notification to (e.g., should a given notification be sent to a smart watch or a mobile phone). The Mobile Notification System passes the notification to the relevant device.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by positioning system 151 and/or first mobile device 155 and/or second mobile device 157 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153, which may be any type of sensors that are able to determine a position of a device, including computer 101, first mobile device 155, second mobile device 157, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with first mobile device 155 and/or second mobile device 157 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with first mobile device 155, second mobile device 157, and/or other systems.

Application programs 143 in computer 101's system memory also include Logic for Managing Notifications to Mobile Devices (LMNMD) 147. LMNMD 147 includes code for implementing the processes described below, including those described in FIG. 2.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
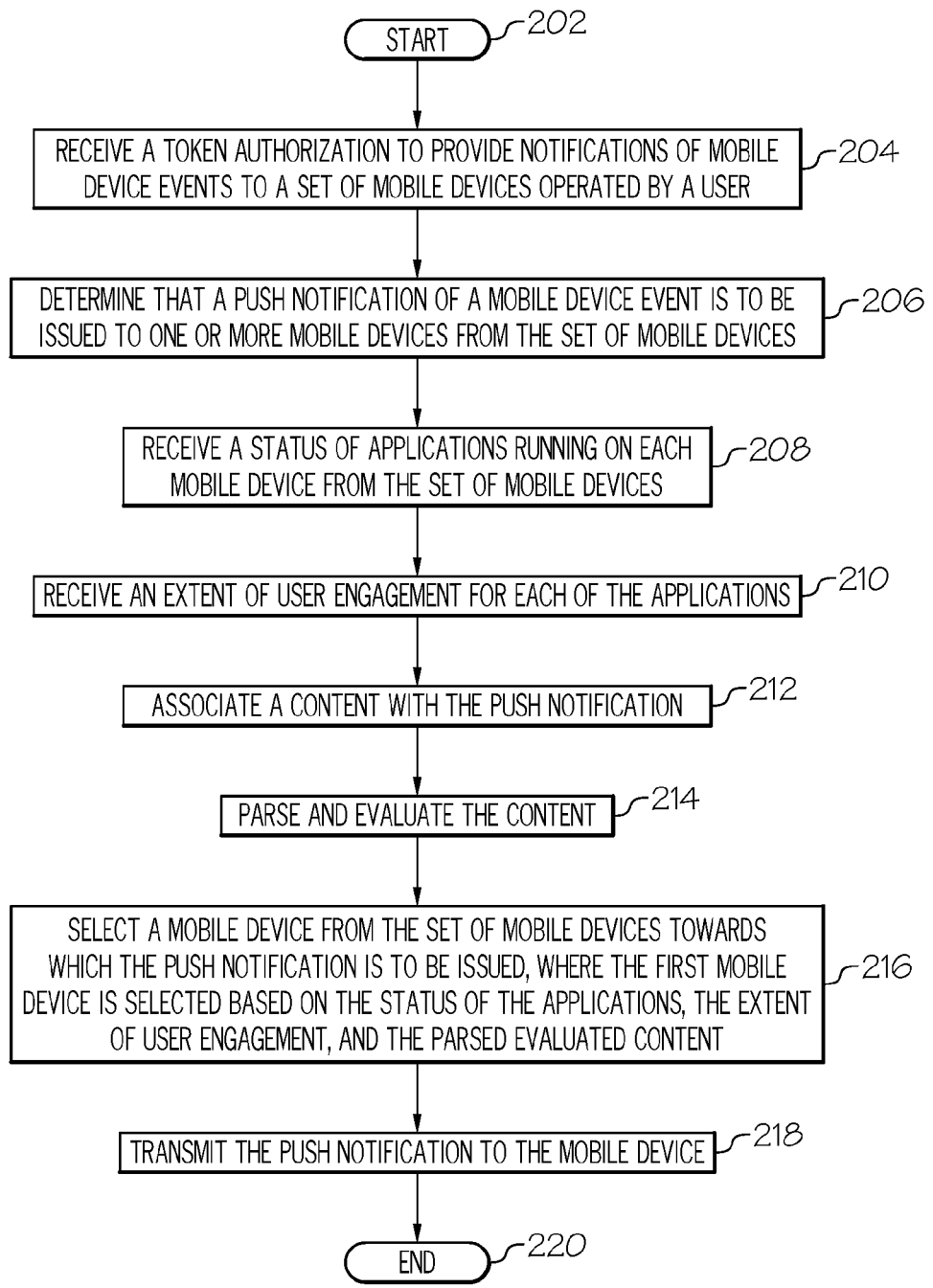
FIG. 2 is a high-level flow chart of one or more steps performed by one or more processors to selectively send notifications to mobile devices.

With reference now to FIG. 2, a high-level flow chart of one or more steps performed by one or more processors to selectively send notifications to mobile devices is presented.

After initiator block 202, one or more processors (e.g., processor 103 in computer 101 depicted in FIG. 1) receive a token authorization to provide notifications of mobile device events to a set of mobile devices operated by a user, as described in block 204. That is, a token (e.g., an access token that allows a computer such as computer 101 to access mobile devices such as the first mobile device 155 and/or the second mobile device 157) allows computer 101 to control which notifications are sent to particular mobile devices, as described herein.

As depicted in block 206, the processor(s) determine that a push notification of a mobile device event is to be issued to one or more mobile devices from the set of mobile devices. That is, computer 101 determines that whenever some event occurs (e.g., new e-mail comes in, a phone call is placed, etc.), and that this event may be selectively handled by a particular mobile device as described herein, then a push notification is issued to the mobile device that is receiving the notification (and thus is experiencing the event).

As depicted in block 208, the processor(s) receive a status of applications running on each mobile device from the set of mobile devices. This status may be active (e.g., is currently running), inactive (e.g., is paused or turned off), blocked (i.e., is prevented from running on this particular mobile device), authorized or unauthorized (i.e., is authorized or unauthorized to run on this particular mobile device), etc.

For example, assume that the positioning system 151 within first mobile device 155 shows that first mobile device 155 is currently in a secure facility that prohibits the use of smart watches to take phone calls, and that first mobile device 155 is a smart watch (which may be used to make nonobvious phone calls). Assume further that second mobile device 157 is a mobile phone, and that this same secure facility allows phone calls to be taken on mobile phones (which are more obvious when used to make a phone call). As such, the status of the phone app on first mobile device 155 is "unauthorized" and/or "blocked", such that no calls can be made to the first mobile device 155. Conversely, the status of the phone app on the second mobile device 157 is "authorized" and/or "unblocked", such that calls (as well as notifications) can be made to the second mobile device 157.

With regard to block 210, the processor(s) receive an extent of user engagement for each of the applications. That is, one or both of the mobile devices 155/157 send a signal/message to computer 101 informing computer 101 of the level of usage/interaction a user is having with particular applications.

As described in block 212, the processor(s) associate a content with the push notification reference in block 206. That is, content (e.g., a phone call, a text message, an alert, etc.) is associated with the push notification.

As described in block 214, the processor(s) then parse and evaluate the content that is associated with the push notification. That is, using NLP or other data evaluation processes, the system determines what type of e-mail, alert, text message is being transmitted.

As described in block 216, the processor(s) select a particular mobile device from the set of mobile devices towards which the push notification is to be issued. This particular mobile device is selected based on the status of the applications (i.e., are they active, authorized, etc.), the extent of user engagement (i.e., is the user currently using this particular app), and the parsed evaluated content (i.e., the meaning and context of the content associated with the notification).

As described in block 218, the processor(s) then transmit the push notification (with the associated content) to that particular mobile device.

The flow chart in FIG. 2 ends at terminator block 220.

In one embodiment of the present invention, the processor(s) receive a message describing an interaction of the user with the first mobile device, and then use that interaction to select a second mobile device from the set of mobile devices towards which a future push notification is issued. For example, if a user has not used his/her smart watch in the past hour (even though the smart watch is turned on and active), then any future notifications will be sent to his/her mobile phone. That is, even though the computer 101 knows that the smart watch is turned on, the user apparently is ignoring it, has placed it in his/her pocket/purse, etc., and thus will not notice any notifications sent to the smart watch. As such, the present invention will send future notifications to the user's mobile phone.

In one embodiment of the present invention, each mobile device from the mobile devices is a different type of mobile device compared to other mobile devices from the set of mobile devices. For example, one mobile device may be a smart watch, another mobile device may be a mobile phone, another mobile device may be a tablet computer, etc. Each type of mobile device has different characteristics, displays, features, etc. As such, the computer 101 may send the notification to the mobile device that is best suited. For example, a phone call/notification may be sent to a smart watch, which is well suited to handling phone calls but not e-mail. Similarly, a tablet computer may be well suited to handling e-mail, but is "overkill" for handling an SMS message/notification, which is best handled by a smart phone. As such, the computer 101 will send phone calls/notifications to the smart watch, e-mails/notifications to the tablet computer, and SMS messages/notifications to the mobile phone.

In one embodiment of the present invention, the processor(s) parse and evaluate the content (associated with the notification) by a natural language processing (NLP) engine, which determines a context/meaning of the content. Based on this parsing/evaluation, the system knows which device to send the notification to, what type of notification alert to use (e.g., a loud alarm for an e-mail about a disaster alert, a soft alarm for an e-mail about routine events, etc.).

In one embodiment of the present invention, the push notification provides notification of a software-based event. These software-based events are events that are handled by and/or are the result of an app executing, such as receiving an incoming text message, receiving an incoming e-mail, generating/displaying a calendar alert, generating/displaying a timer alarm, receiving an incoming phone call, receiving an incoming software update (to a particular app), receiving a weather report from a weather service, generating/displaying an error message (i.e., a fault message describing a problem with a particular app), etc.

In one embodiment of the present invention, the processor(s) receive a sensor reading from a hardware sensor (e.g., one or more of the hardware sensors 159 depicted in FIG. 1). The hardware sensor detects a physical condition of hardware in the first mobile device, such as CPU usage, temperature, bus bandwidth, I/O bandwidth, etc. These sensor readings are included in the content that is associated with the push notification. The processor(s) then use these sensor readings to select a second mobile device from the set of mobile devices towards which a future push notification is issued. For example, if the smart watch (a first mobile device) gets so hot that it is likely to malfunction (e.g., the watch is dropped into hot water), then incoming phone calls will go to the mobile phone (a second mobile device) rather than the smart watch.

In one embodiment of the present invention, the processor(s) identify a push notification type for the push notification and an application type for the application involved in the user engagement. The processor(s) then compare the push notification type to the application type. If the push notification type matches the application type according to predefined criteria, then the push notification is authorized to be transmitted to the first mobile device. If not, then the push notification is blocked from being further transmitted to the first mobile device. That is, if the push notification is for an e-mail, but there is no e-mail app on a first mobile device that is assigned to a user, then the e-mail is pushed to a second mobile device that is also assigned to that same user.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
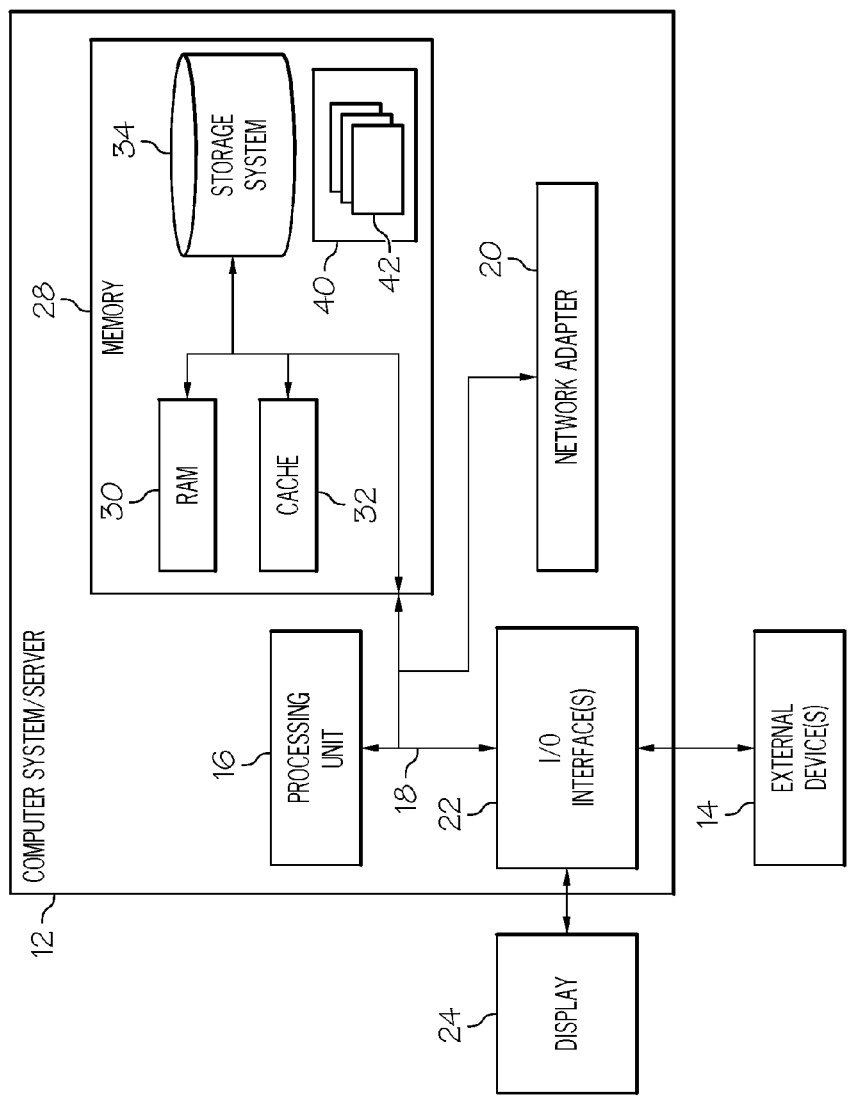
FIG. 3 depicts a cloud computing node according to an embodiment of the present disclosure.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
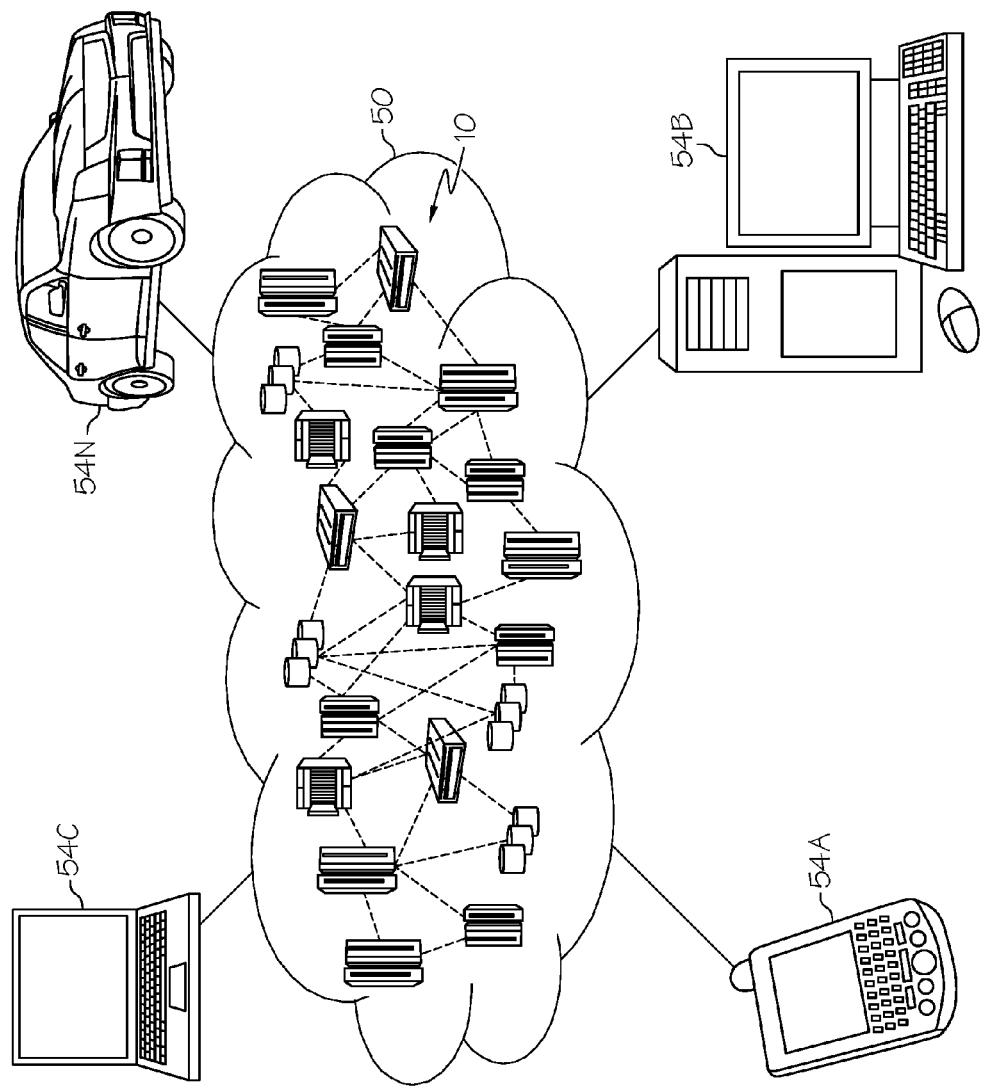
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
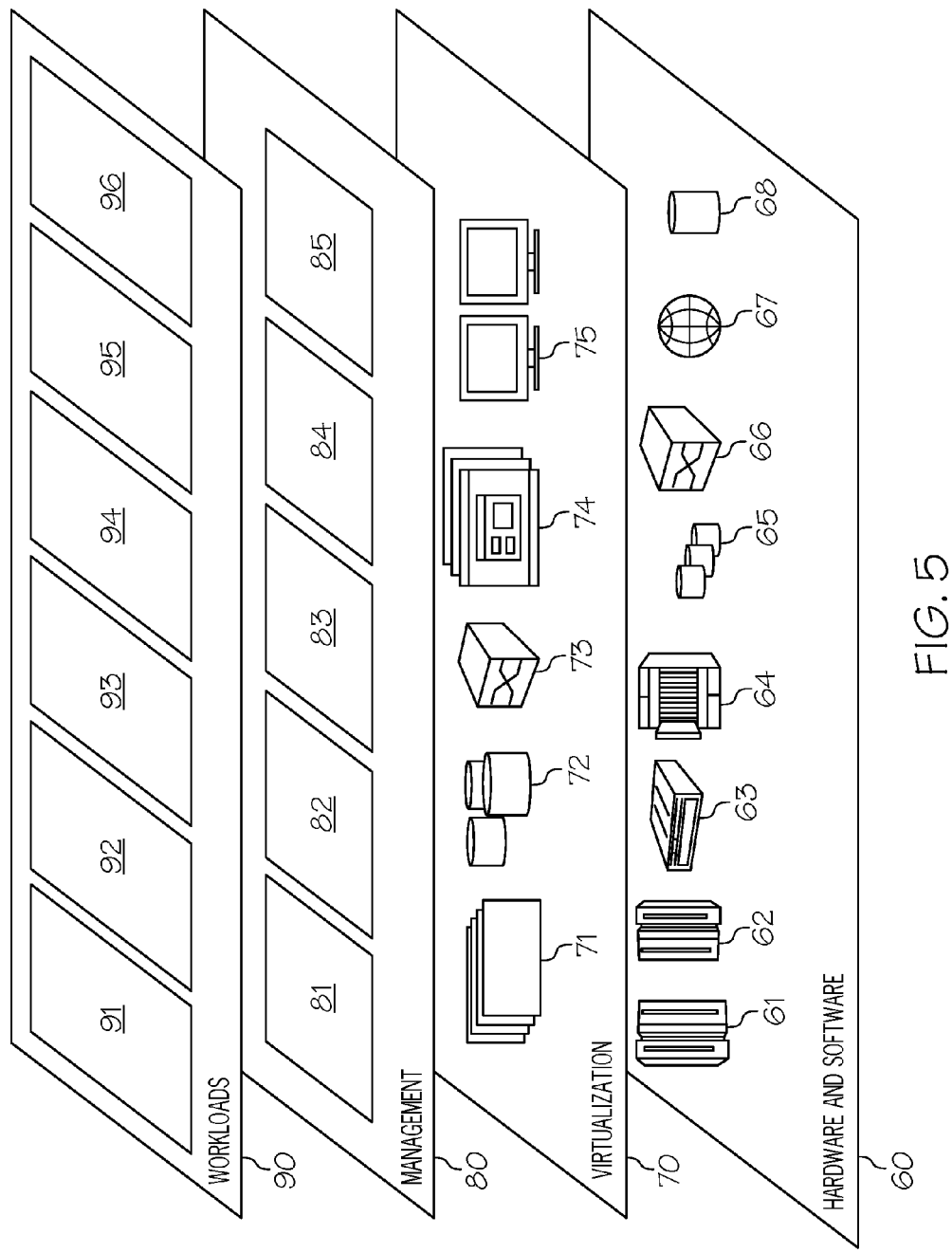
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification selection and transmission processing 96 (for selectively sending notifications to mobile devices as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of selectively sending push notifications to mobile devices, the computer-implemented method comprising:
  determining, by one or more processors, that a push notification of a mobile device event is to be issued to one or more mobile devices from a set of mobile devices;

receiving, by one or more processors, a status of applications running on at least one mobile device from the set of mobile devices;

receiving, by one or more processors, an extent of user engagement for at least one of the applications;

associating, by one or more processors, a content with the push notification;

parsing and evaluating, by one or more processors, the content that is associated with the push notification;

selecting, by one or more processors, a first mobile device from the set of mobile devices towards which the push notification is to be issued, wherein the first mobile device is selected based on the status of the applications, the extent of user engagement, and the parsed evaluated content; and transmitting, by one or more processors, the push notification to the first mobile device.

2. The computer-implemented method of claim 1, further comprising:

receiving, by one or more processors, a message describing an interaction of a user with the first mobile device; and using, by one or more processors, the interaction to select a second mobile device from the set of mobile devices towards which a future push notification is issued.

3. The computer-implemented method of claim 1, wherein each mobile device from the mobile devices is a different type of mobile device compared to other mobile devices from the set of mobile devices.

4. The computer-implemented method of claim 1, further comprising:

parsing and evaluating, by one or more processors, the content by a natural language processing (NLP) engine, wherein the NLP engine determines a context of the content.

5. The computer-implemented method of claim 1, wherein the push notification provides notification of a software-based event, wherein the software-based event is from a group consisting of an incoming text message, an incoming e-mail, a calendar alert, a timer alarm, an incoming phone call, an incoming software update, a weather report, and an error message related to the status of the applications.

6. The computer-implemented method of claim 1, further comprising:

receiving, by one or more processors, a sensor reading from a hardware sensor in the first mobile device, wherein the hardware sensor detects a physical condition of hardware in the first mobile device;

including, by one or more processors, the sensor reading in the content that is associated with the push notification; and using, by one or more processors, the sensor reading to select a second mobile device from the set of mobile devices towards which a future push notification is issued.

7. The computer-implemented method of claim 1, further comprising:

identifying, by one or more processors, a push notification type for the push notification;

identifying, by one or more processors, an application type for the application involved in the user engagement;

comparing, by one or more processors, the push notification type to the application type; and in response, by one or more processors, to the push notification type matching the application type according to predefined criteria, authorizing the push notification to be transmitted to the first mobile device.

8. The computer-implemented method of claim 1, further comprising:

identifying, by one or more processors, a push notification type for the push notification;

identifying, by one or more processors, an application type for the application involved in the user engagement;

comparing, by one or more processors, the push notification type to the application type; and in response to the push notification type not matching the application type according to predefined criteria, blocking, by one or more processors, the push notification from being further transmitted to the first mobile device.

9. A computer program product for selectively sending notifications to mobile devices, the computer program product comprising a non-transitory computer readable storage medium having program code embodied therewith, the program code readable and executable by a processor to perform a method comprising:

determining that a push notification of a mobile device event is to be issued to one or more mobile devices from a set of mobile devices;

receiving a status of applications running on at least one mobile device from the set of mobile devices;

receiving an extent of user engagement for at least one of the applications;

associating a content with the push notification;

parsing and evaluating the content that is associated with the push notification;

selecting a first mobile device from the set of mobile devices towards which the push notification is to be issued, wherein the first mobile device is selected based on the status of the applications, the extent of user engagement, and the parsed evaluated content; and transmitting the push notification to the first mobile device.

10. The computer program product of claim 9, wherein the method further comprises:

receiving a message describing an interaction of a user with the first mobile device; and using the interaction to select a second mobile device from the set of mobile devices towards which a future push notification is issued.

11. The computer program product of claim 9, wherein each mobile device from the mobile devices is a different type of mobile device compared to other mobile devices from the set of mobile devices.

12. The computer program product of claim 9, wherein the method further comprises:

parsing and evaluating the content by a natural language processing (NLP) engine, wherein the NLP engine determines a context of the content.

13. The computer program product of claim 9, wherein the push notification provides notification of a software-based event, wherein the software-based event is from a group consisting of an incoming text message, an incoming e-mail, a calendar alert, a timer alarm, an incoming phone call, an incoming software update, a weather report, and an error message related to the status of the applications.

14. The computer program product of claim 9, wherein the method further comprises:

receiving a sensor reading from a hardware sensor in the first mobile device, wherein the hardware sensor detects a physical condition of hardware in the first mobile device;

including the sensor reading in the content that is associated with the push notification; and using the sensor reading to select a second mobile device from the set of mobile devices towards which a future push notification is issued.

15. The computer program product of claim 9, wherein the method further comprises:

identifying a push notification type for the push notification;

identifying an application type for the application involved in the user engagement;

comparing the push notification type to the application type; and in response to the push notification type matching the application type according to predefined criteria, authorizing the push notification to be transmitted to the first mobile device.

16. The computer program product of claim 9, wherein the method further comprises:

identifying a push notification type for the push notification;

identifying an application type for the application involved in the user engagement;

comparing the push notification type to the application type; and in response to the push notification type not matching the application type according to predefined criteria, blocking the push notification from being further transmitted to the first mobile device.

17. A computer system comprising:

a processor, a computer readable memory, and a non-transitory computer readable storage medium;

first program instructions to determine that a push notification of a mobile device event is to be issued to one or more mobile devices from a set of mobile devices;

second program instructions to receive a status of applications running on at least one mobile device from the set of mobile devices;

third program instructions to receive an extent of user engagement for at least one of the applications;

fourth program instructions to associate a content with the push notification;

fifth program instructions to parse and evaluate the content that is associated with the push notification;

sixth program instructions to select a first mobile device from the set of mobile devices towards which the push notification is to be issued, wherein the first mobile device is selected based on the status of the applications, the extent of user engagement, and the parsed evaluated content; and seventh program instructions to transmit the push notification to the first mobile device; and wherein the first, second, third, fourth, fifth, sixth, and seventh program instructions are stored on the non-transitory computer readable storage medium for execution by one or more processors via the computer readable memory.

18. The computer system of claim 17, further comprising:

eighth program instructions to receive a message describing an interaction of a user with the first mobile device; and ninth program instructions to use the interaction to select a second mobile device from the set of mobile devices towards which a future push notification is issued; and wherein the eighth and ninth program instructions are stored on the non-transitory computer readable storage medium for execution by one or more processors via the computer readable memory.

19. The computer system of claim 17, wherein each mobile device from the mobile devices is a different type of mobile device compared to other mobile devices from the set of mobile devices.

20. The computer system of claim 17, further comprising:

eighth program instructions to receive a sensor reading from a hardware sensor in the first mobile device, wherein the hardware sensor detects a physical condition of hardware in the first mobile device;

ninth program instructions to include the sensor reading in the content that is associated with the push notification; and tenth program instructions to use the sensor reading to select a second mobile device from the set of mobile devices towards which a future push notification is issued; and wherein the eighth, ninth, and tenth program instructions are stored on the non-transitory computer readable storage medium for execution by one or more processors via the computer readable memory.

* * * * *